US008756786B1

(12) United States Patent
Clarke

(10) Patent No.: US 8,756,786 B1
(45) Date of Patent: Jun. 24, 2014

(54) METHOD OF FASTENING CORKS

(76) Inventor: Daniel Clarke, San Fransisco, CA (US)

( * ) Notice: Subject to any disclaimer, the term of this patent is extended or adjusted under 35 U.S.C. 154(b) by 357 days.

(21) Appl. No.: 13/199,622

(22) Filed: Sep. 6, 2011

(51) Int. Cl.
*B23P 19/04* (2006.01)

(52) U.S. Cl.
USPC .......... 29/433

(58) Field of Classification Search
USPC .......... 29/433, 428, 436; 273/159
See application file for complete search history.

(56) References Cited

U.S. PATENT DOCUMENTS

| | | | | |
|---|---|---|---|---|
| 2,877,506 | A | 3/1959 | Almoslino | |
| 3,222,072 | A | 12/1965 | Dreyer | |
| 3,597,872 | A | 8/1971 | Vennola | |
| 4,418,915 | A * | 12/1983 | Calebs | 273/159 |
| 4,997,375 | A | 3/1991 | Heinz | |
| D433,199 | S | 10/2000 | Goldberg | |
| D475,094 | S | 5/2003 | Ko | |

* cited by examiner

*Primary Examiner* — John C Hong
(74) *Attorney, Agent, or Firm* — Harpman & Harpman

(57) ABSTRACT

A method of interconnecting multiple bottle cork closure elements to form a variety of useful integrated constructions. The method uses one or more string strands of flexible yielding material to be passed through custom configured passageways within each cork in continuous pass through patterns defined by similar and varied passageways in adjacent abutting corks. The interconnecting pattern path of the strands defines intermediate points of applied tension and selective securing in a defined assembly step process to form the respective article of construction.

8 Claims, 8 Drawing Sheets

METHOD OF FASTENING CORKS

BACKGROUND OF THE INVENTION

1. Technical Field

This invention relates to formation of articles by interconnecting a plurality of smaller identical elements by a variety of different interengagement materials and methods. Specifically to the joining together of bottle corks in mass to define useful structures.

2. Description of Prior Art

Prior art constructions of multiple similar elements to form large configurations have been directed to many attachment and securing connector sequences. Heretofore, such assemblies have relied on relatively common methods including direct attachment by adhesive such a glue or combination of adhesive and cordage, for example, in which slots or bores are made in the corks and a core is passed therethrough, see for example U.S. Pat. Nos. 2,877,506, 3,222,072, 3,597,872, 4,997,375 and Design Pat. 433,199 and 475,094.

In U.S. Pat. No. 2,877,506 an article support assemblage is disclosed in which a group of identical shaped blocks having angled opposing forms with respective grooves and ridges are interconnected together by a central rigid rod.

U.S. Pat. No. 3,222,072 illustrates a block puzzle wherein a number of blocks having passageways therethrough are joined together by a string-like member to form different shaped constructions.

U.S. Pat. No. 3,597,872 claims a toy comprised of a plurality of shaped bodies held together by a cord extending therethrough.

U.S. Pat. No. 4,997,375 is directed to an elastically interconnected articulated blocks wherein each block has a deep slot and aerial hole formed by sponging adjacent block segments to form multiple block constructions.

Design Pat. 433,199 shows multiple bottle corks secured together to form a bird house and Design Pat. 475,094 is a puzzle formed of multiple blocks hinged together along their respective adjoining edges.

SUMMARY OF THE INVENTION

A method of assembly construction of articles by joining together of the multiplicity of bottle corks. The corks are provided with passageways through which elongated flexible string material is threadably interconnected and drawn together the multiple corks in multiple adjoining surface engagement. The assembled articles have no outwardly visible means of attachment by suppression of interior passage of the interconnecting strings.

DETAILED DESCRIPTION OF THE INVENTION

Referring to FIGS. 1-18 of the drawings, a basic bottle cork preparation and joining method steps of the invention can be seen to initiate multiple cork constructions of useful articles and the like.

Figure 1:
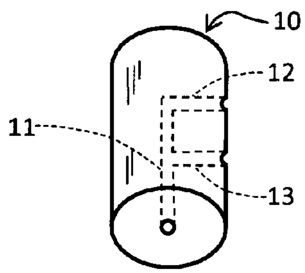
FIG. 1 is a perspective view of a cork with interconnected passageways shown in broken lines.
Figure 2:
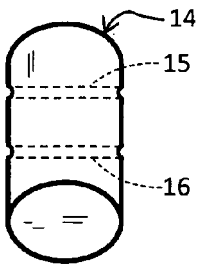
FIG. 2 is a perspective view of a cork with spaced parallel transverse passageways therethrough.
Figure 3:
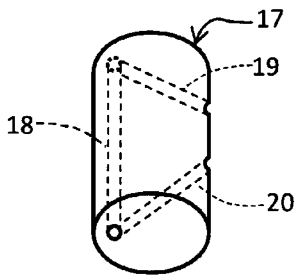
FIG. 3 is a perspective view of a cork with internal passageways having spaced adjacent exits.

FIGS. 1-3 of the drawings illustrate some of the basic cork preparation in its simplest form. FIG. 1 of the drawings illustrates a cork 10 having a central longitudinally extending passageway 11 with two right angularly extending and spaced side exit passageways 12 and 13 in intersection therewith.

FIG. 2 of the drawings illustrates a cork 14 having a pair of parallel spaced passageways 15 and 16 extending transversely and exiting correspondingly on the respective oppositely disposed sides in spaced relation to the longitudinal axis ends of the cork 14.

FIG. 3 illustrates a cork 17 having an off center longitudinally extending passageway 18 end exiting with corresponding angularly extending spaced side exiting passageways 19 and 20 inwardly from the corks respective ends.

Figure 4:
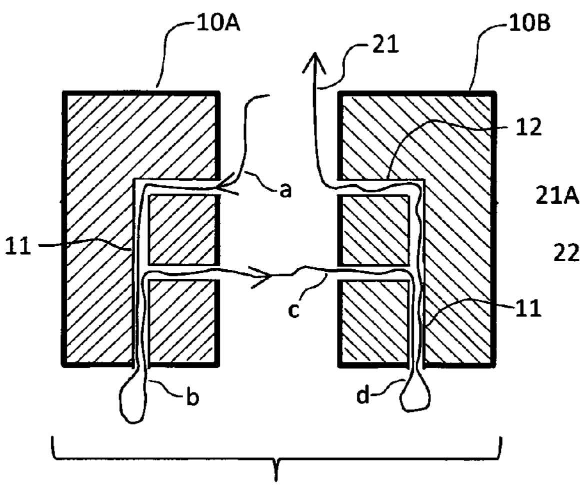
FIG. 4 is an enlarged cross-sectional view of a pair of corks shown from FIG. 1 positioned for joining together with an interior string.
Figure 5:
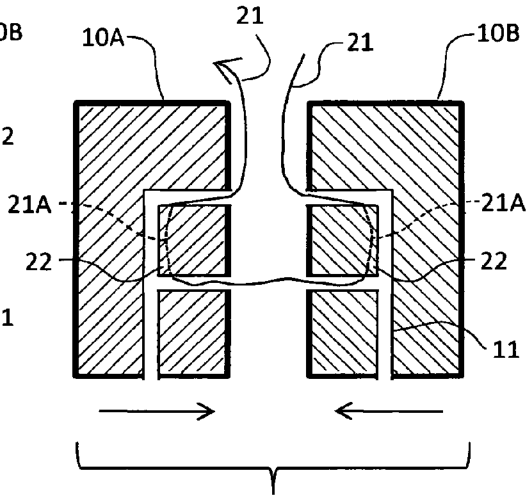
FIG. 5 is an enlarged cross-sectional view of a pair of corks shown from FIG. 1 of being drawn together by the string extending therethrough.
Figure 6:
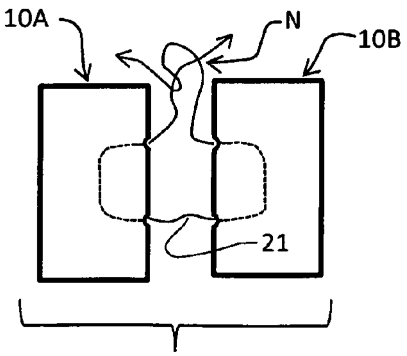
FIG. 6 is a side elevational view of a pair of corks shown in FIG. 5 of the knot being formed in the string for drawing same together.
Figure 7:
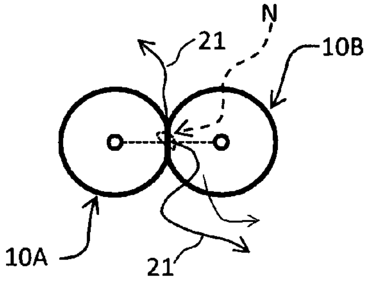
FIG. 7 is an end plan view of the cork shown in FIG. 6 illustrating the corks drawn together with a fastener knot secured therebetween.

In FIGS. 4-7 of the drawings, examples of joining of the so configured cork as illustrated in pairs. Referring to FIG. 4 of the drawings a configured cork pair 10A and 10B can be seen wherein a length of interengagement string 21 having a flexible yielding characteristic is passed through the passageways 11, 12, and 13 in a directional sequence indicated by the letters a, b c and d so defining the string 21 orientation illustrated in FIGS. 5, 6 and 7 for joining the corks 10A and 10B together in a side to side relationship with a knot N on the free ends thereof. It is understood that knot N is the widely known method of joining two string ends together, commonly called a square knot, but also known as a reef knot, used when a string has been wrapped and sufficiently tightened around a package and the string ends are intended to be permanently secured and resistant to slippage. Knot N is formed by first making a left-handed overhand knot and then making a right-handed overhand knot, or visa-versa, as recalled by the familiar verse "right over left then left over right," and wherein the first overhand knot allows slippage or further tightening and the second overhand knot permanently locks the string against slippage or further tightening. During assembly under string tension, internal portions 21A of the string 21 embed themselves in corresponding cork areas 22 between the respective parallel side openings 12 and 13, best seen in FIG. 5 of the drawings and are drawn together as directional arrows indicate with the first overhand knot being instituted as illustrated in FIG. 6 and the joined cork pairs 10A and 10B with the second overhand knot being instituted illustrated in FIG. 7 of the drawings showing the fully assembled knot N hidden therebetween. Also, immediately preceding instituting the second overhand knot illustrated in FIG. 7, additional compression of the corks may be induced from the outside perimeter allowing further tightening of the assembly and further embedding internal portions 21A of the string 21.

Figure 8:
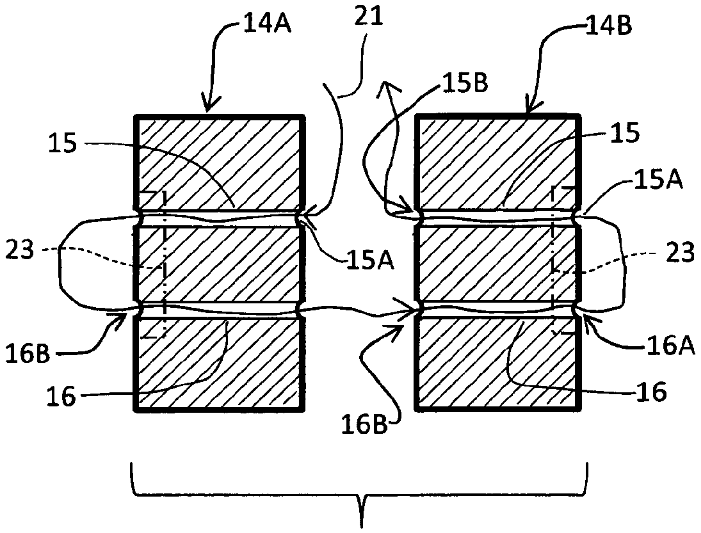
FIG. 8 is an enlarged cross-section view of the corks shown from FIG. 2 with an internal interengagement attachment pattern achieved by a string.
Figure 9:
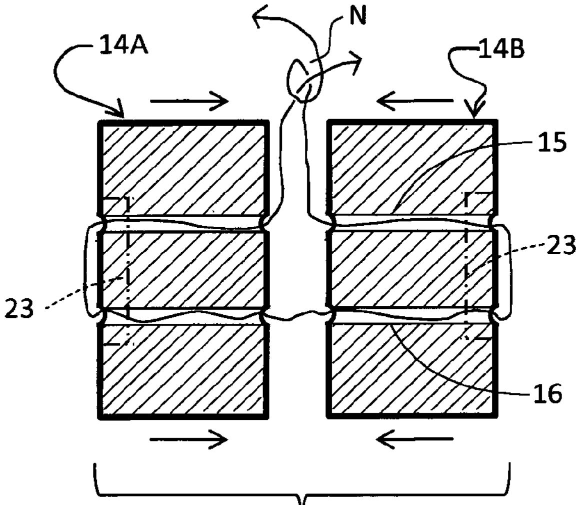
FIG. 9 is an enlarged cross-sectional view of the corks shown in FIG. 8 showing the progressive engagement of the corks together by the string pattern interconnecting same.
Figure 10:
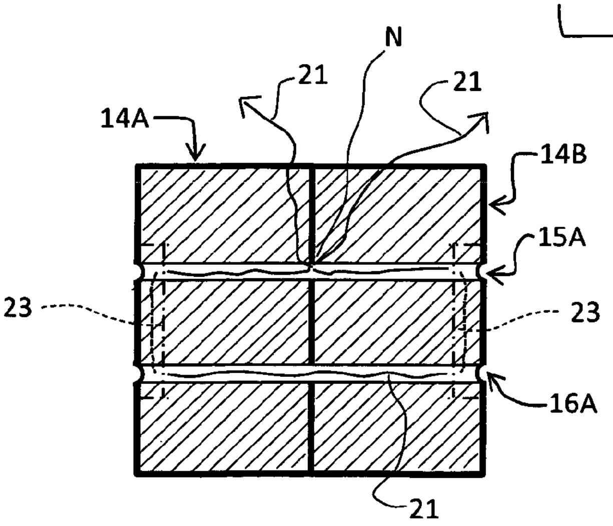
FIG. 10 is an enlarged cross-sectional view of the corks of FIGS. 8 and 9 shown pulled together by the interconnecting string and the orientation of the passageway therewithin.

Referring now to FIGS. 8, 9 and 10 of the drawings, an interengagement attachment sequence is illustrated for a pair of prepared corks 14A and 14B configured as seen in FIG. 2 of the drawings, each with respective pairs of parallel spaced side exiting passageways 15 and 16.

A length of interengagement string 21 (in this example) is first passed through the transverse passageway 15 at a side exit 15A and then back through passageway 16 at side exit 16B. Cork 14B correspondingly receives so leading end of the string 21 through its passageway exit 16B and then looped back through passageway 15 at exit 15A and out through cork 14B's exit at 15B as seen in FIG. 8 of the drawings.

In this example, string engagement slits 23 are formed in each of the corks 14A and 14B inwardly between and connecting the respective is passageways 15 and 16 at one set of respective exits as illustrated in broken lines.

The respective free ends of the interconnection string 21 are then tied together with the retaining knot N which as joined is hidden between the joined side cork surfaces 14A and 14B as illustrated best in FIG. 10 of the drawings.

The string engagement slits 23 allow for the string 21 to be easily embedded into the interior of the corks, hiding the string 21 as completed in a joined cork configuration 14A and 14B.

Figure 11:
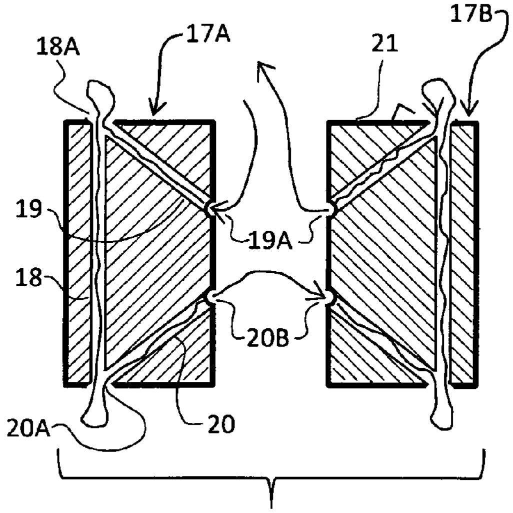
FIG. 11 is an enlarged cross-sectional view of the cork shown in FIG. 3 in a pair adjoining together with an internal string pattern illustrated.
Figure 12:
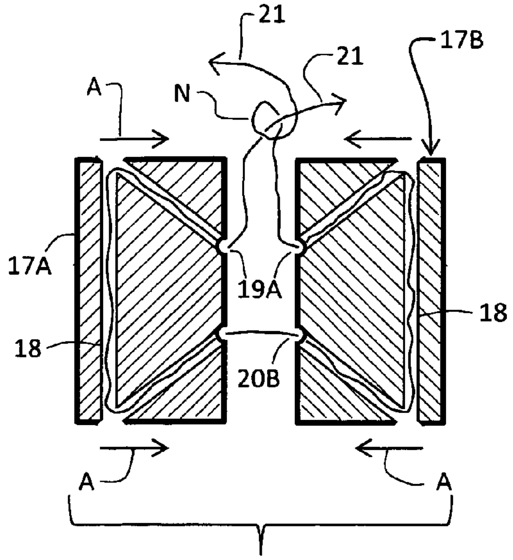
FIG. 12 is an enlarged cross-sectional view of the cork shown in FIG. 11 illustrating the drawing together of the corks by the string attachment pattern forming a knot therein.
Figure 13:
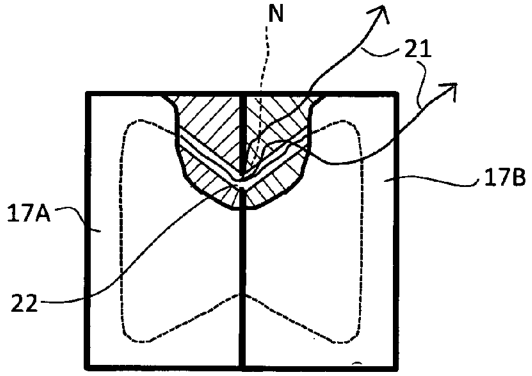
FIG. 13 is an enlarged side elevational view with portions broken away in cross-section illustrating the corks in FIGS. 11 and 12 joined together by the internal string and the path of the string and interengagement knot.

Referring now to FIGS. 11, 12 and 13 of the drawings, an interconnection string joining sequence for passageway configured cork 17 can be seen with a pair of identical corks 17A and 17B being positioned for joining in parallel spaced relationship.

Referring to FIG. 11 of the drawings the interconnection string portion 21 as hereinbefore described is first (in this example) is passed through the angular side exit passageway 19 at 19A indicated by directional arrow and then looped back through the cork 17A in the longitudinally extending passageway 18 at 18A. The interconnecting string 21 is then looped back again through the adjoining angled passageway 20 at 20A exiting outwardly therefrom at 20B into the corresponding cork's 17B angular passageway at 20B repeating the pass through sequence in reverse so as to finally exit at cork's 17B exit 19A opposite its point of initial entry into cork 17A.

Referring to FIG. 12 of the drawings, the respective free ends of the interengagement string 21 are joined by the first overhand knot N and pulled down between the adjacent corks as they are drawn together indicated by directional arrows A joining the corks 17A and 17B side to side as seen in FIG. 13 of the drawings. A second and locking overhand knot is formed and square knot N is hidden between where the side passageways meet at 22. Additional square or reef knots may be formed at 22 to ensure joining as is understood within the art. As noted previously, the interengagement string 21 will be by default partially embedded within the interior of the corks 17A and 17B between the respective exits and entrances 18A and 20A as indicated generally in the string orientation position shown in dotted lines therein.

Figure 14:
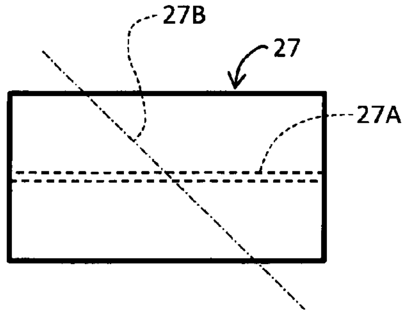
FIG. 14 is a side elevational view of a corner formation cork with a center access passageway in a cross angular separation shown by a broken line there across.
Figure 15:
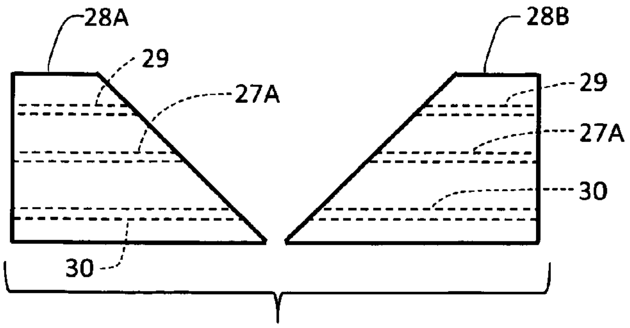
FIG. 15 is a side elevational view of the separated cork shown in FIG. 14 positioned for engagement with multiple passageways therethrough.

Referring now to FIGS. 14-18 of the drawings, an interengagement string assembly sequence is shown for the formation of a so-called "corner cork" 26 as seen in sequence completion in FIGS. 14-18 of the drawings. A cork 27 with a central longitudinally extending passageway 27A prepared for assembly as seen in FIG. 14 of the drawings by indicated transverse angular cut path in broken lines at 27B to form two independent corner portions 28A and 28B with multiple additional longitudinal passageways 29 and 30 therethrough and positioned effacing one another for joining as illustrated in FIG. 15 of the drawings.

Figure 16:
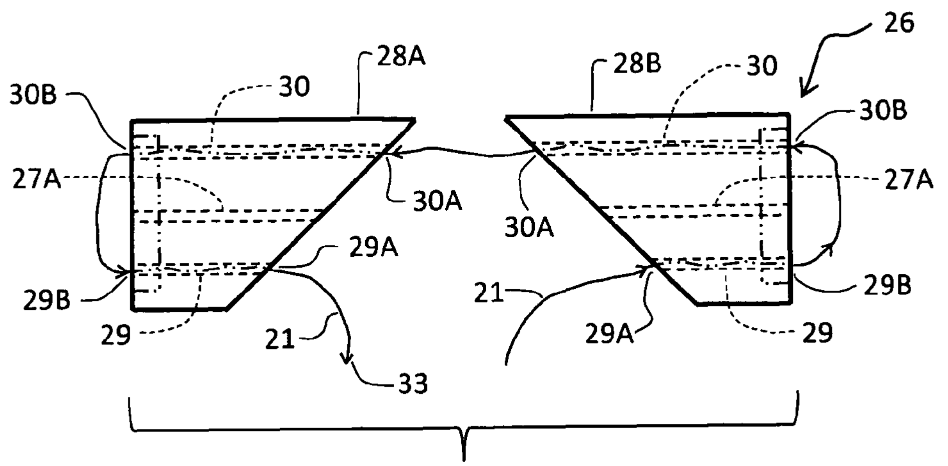
FIG. 16 is an enlarged side elevational view of the cork shown in FIG. 15 reversed and positioned showing a string pattern extending therethrough.
Figure 17:
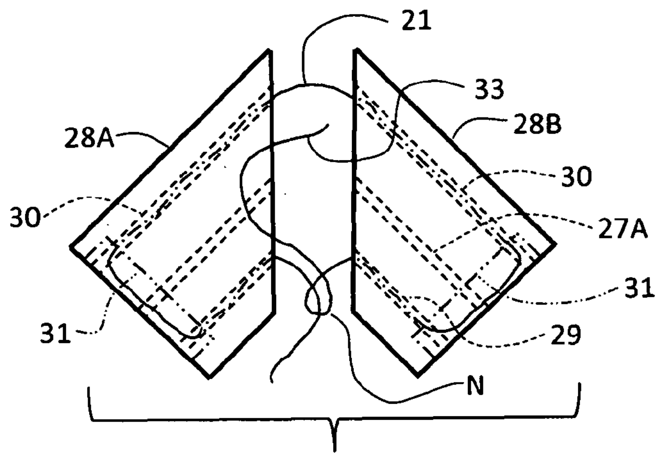
FIG. 17 is an enlarged side elevational view of the cork shown in FIG. 16 drawn together by the string and forming an overhand knot.
Figure 18:
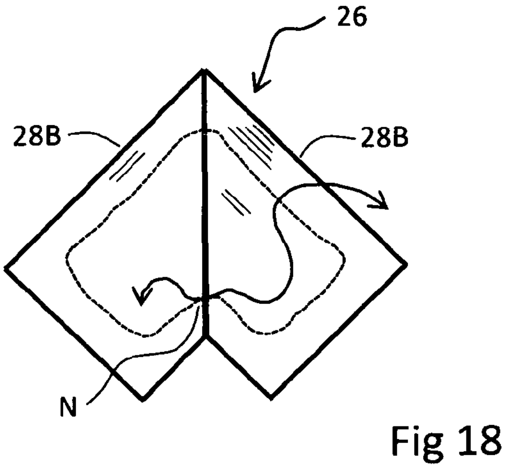
FIG. 18 is an enlarged side elevational view of the corks in FIG. 17 now drawn together in a corner configuration illustrating the attachment interior string in broken lines and the knot associated therewith.

The cork portions 28A and 28B as seen in sequential corner formation drawings in FIGS. 16, 17 and 18 of the drawings have interengagement string engagement slits 31 respectively interlinking passageways 29 and 30 exit points thereof. A string portion 21 (in this example) is first passed into cork portion 28B's passageway 29 at exit 29A and out through exit 29B. The interconnecting string portion 21 then loops back through passageway 30 at exit 30B and out through exit 30A and then enters the so-aligned cork portion 28A into passageway 30 at exit 30A. Correspondingly, a reverse pass through interconnecting string pattern is achieved ending up with the free end of the string 21 at 33 as it exits cork portions 28A, passageway 29 at exit 29A.

The free ends of the interconnecting string portion 21 are then interengaged to one another by a knot N and pulled under tension joining the respective cork portions 28A and 28B with the interconnection string 21 embedded therewithin by the hereinbefore described slits 31 to form the true corner cork 26 as seen in FIG. 18 of the drawings.

Figure 19:
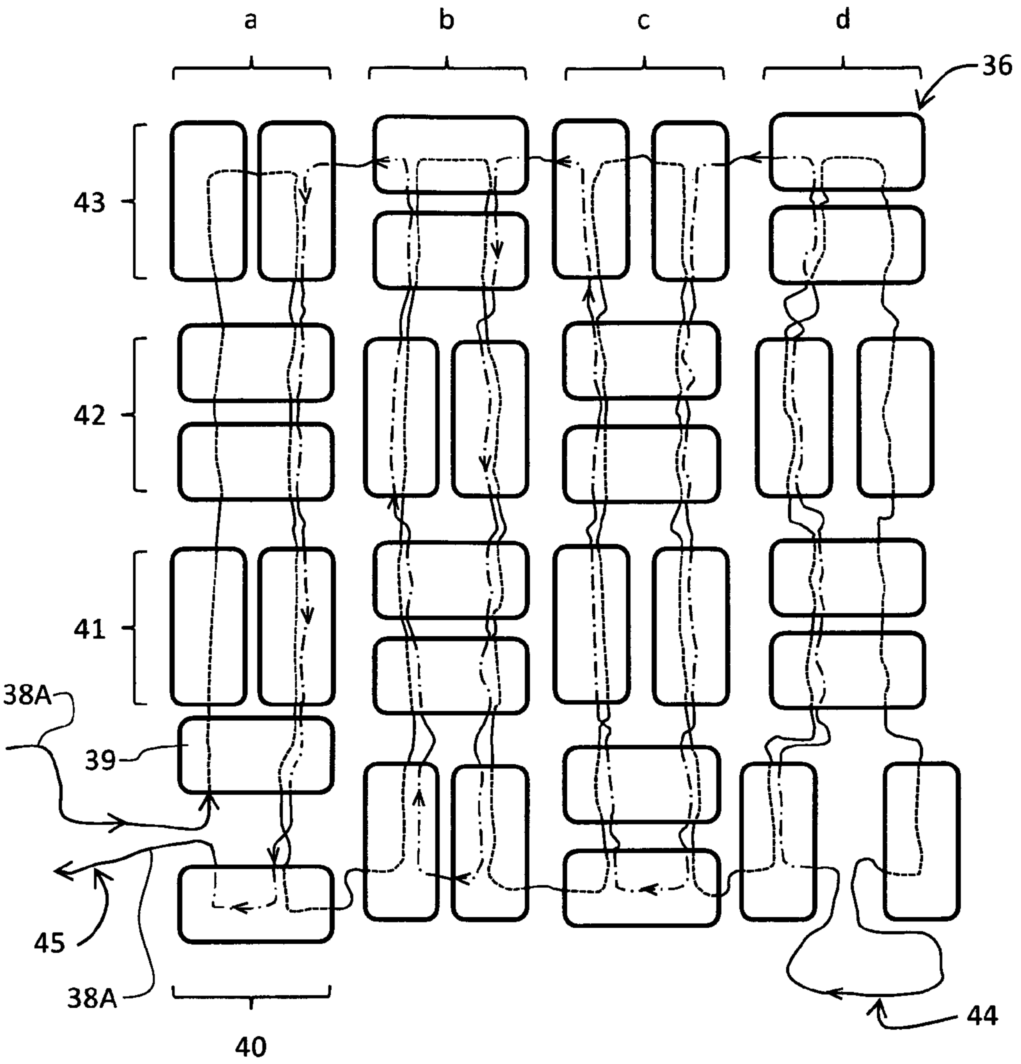
FIG. 19 is a top plan view of multiple corks arranged in alternating pairs with an internal engagement connection string path shown in dotted and broken lines extending in a continuous return vertical orientation loop extending therethrough.
Figure 20:
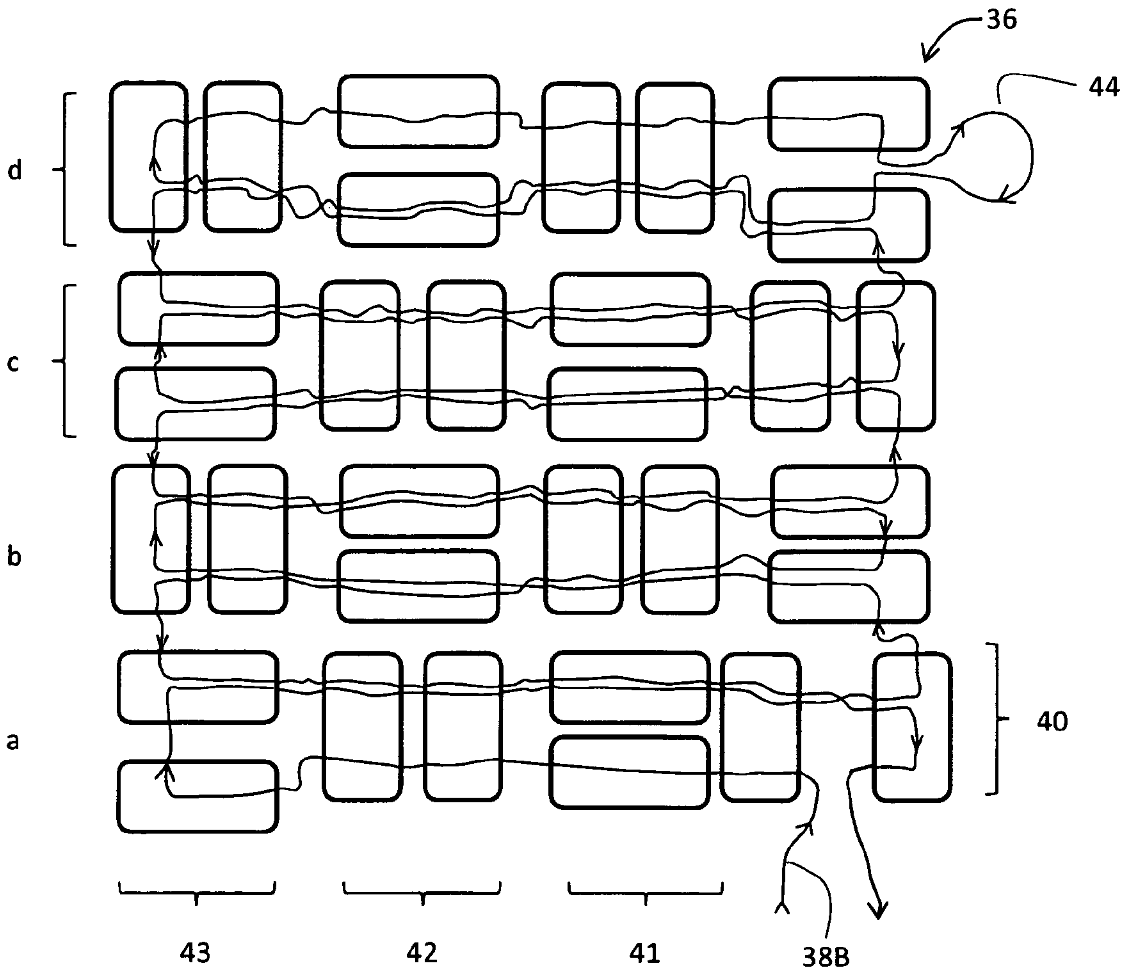
FIG. 20 is a top plan view of the multiple cork arrangement shown in FIG. 19 with a quarter turn orientation illustration a second continuous string loop extending horizontally oriented therethrough.

Referring now to FIGS. 19 and 20 of the drawings, an example of a multiple cork construction 36 can be seen utilizing in combination the multiple hereinbefore described corked pair joining methods and two interconnection string strands 38A and 38B. As noted, multiple cork pairs configured with passageways are joined together by multiple string paths. In this example, interconnection string strand portion 38A enters a "starter" cork 39 of a corner cork pair 40 and extends through multiple aligned cork pairs 41, 42 and 43 in alternating paired orientation. The string strand portion 38A is illustrated in dotted lines passing through the respective engaged corks in one direction then returning through the cork pair sequence 43, 42 and 41 and 40 in the opposite direction returning to the base pair 40. This interengaging through multiple adjacent aligned cork pairs extends sequentially in a repetitive fashion from defined cork pairs vertical orientation columns a, b, c and d then returning in reverse sequence d, c, b and a from a turn around loop of the string strand portion 38A at 44 illustrated path in broken lines within each cork passageway exiting at 45 in the original cork pair 40.

Figure 21:
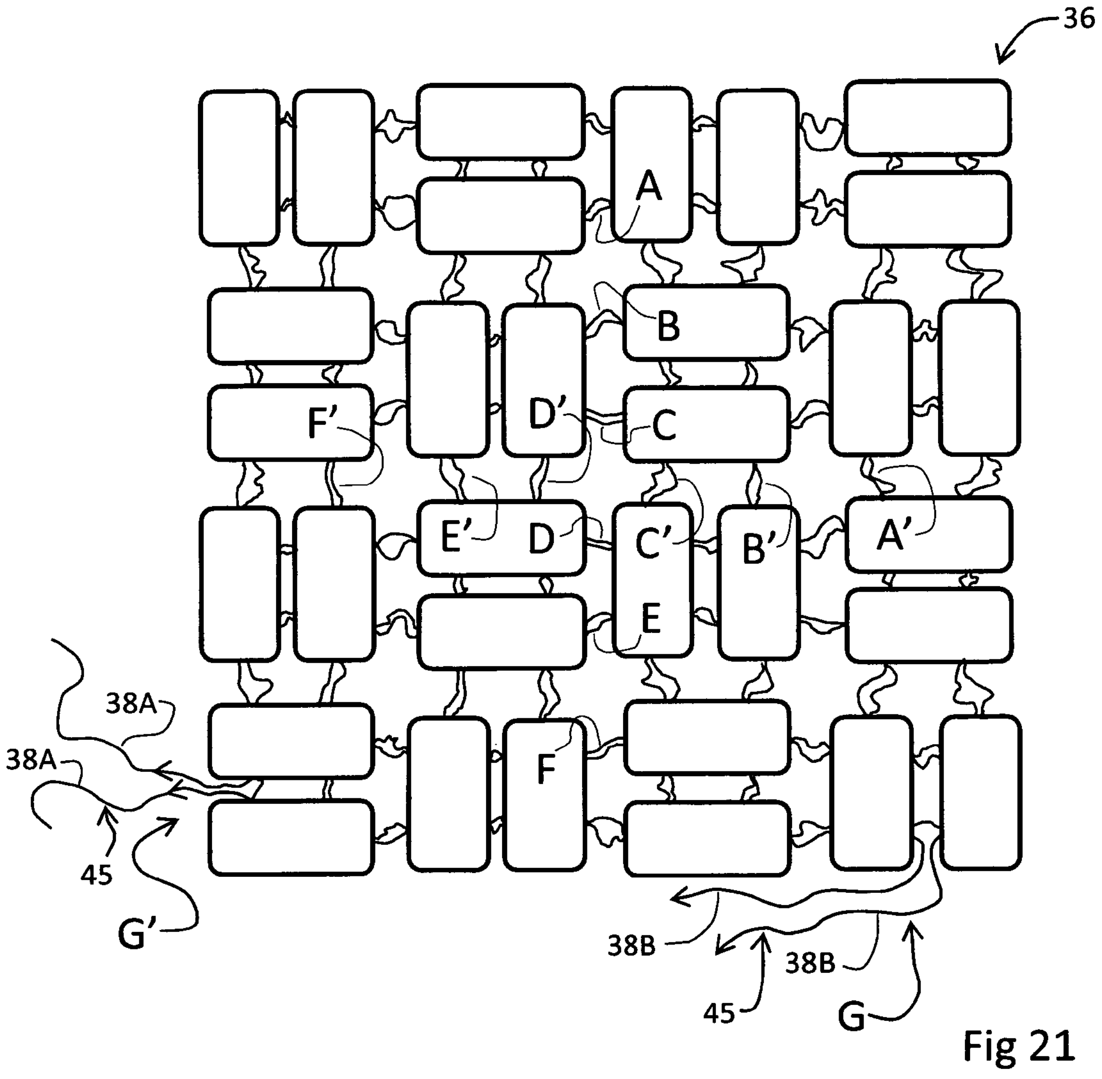
FIG. 21 is a top plan view of the multiple corks arranged in FIGS. 19 and 20 combined as in a construction step showing both horizontal and vertical string loop interengagement passageway pattern therethrough with multiple points of assembly adjustment indicated selectively therewithin.

Referring now to FIG. 20 of the drawings in which the orientation of the cork construction has been turned one-fourth clockwise for better illustration, the second interengagement string 38B pass through pattern can be seen, but on a horizontal orientation as described which so combined during assembly forms a finalized multiple vertical and horizontal interengagement string paths achieved as seen in FIG. 21 of the drawings prior to selected sequential string tensioning to complete the construction as will be described hereinafter.

Once the multi-adjoining interengagement string strands 38A and 38B sequence pass through is achieved by utilization of the so-configured cork passageways and patterns in horizontal and vertical orientation as seen in FIG. 21 of the drawings, a interengagement string strand tightening sequence is instituted for both interengagement string strands 38A and 38B. Two sets of multiple string engagement points are defined as A, B, C, D, E, F and G and A', B', C', D', E', F' and G'. Manual user engagement by pulling each of the engagement points A-G are instituted sequentially beginning at point A where two parts of the interconnection string strand 38B join between adjacent corks drawing the string pairs 38B and by tightening as the sequence proceeds removing the excess string or slack from 38B. Then, manual user engagement continues by pulling each of the engagement points A'-G' are instituted sequentially beginning at point A' where two parts of the interconnection string strand 38A join between adjacent corks drawing the string pairs 38A and by tightening as the sequence proceeds removing the excess string or slack from 38A.

This is achieved as the user independently pulls each of the ends of one string strand at a time with the slack residing finally at respective exit points so defined.

Figure 22:
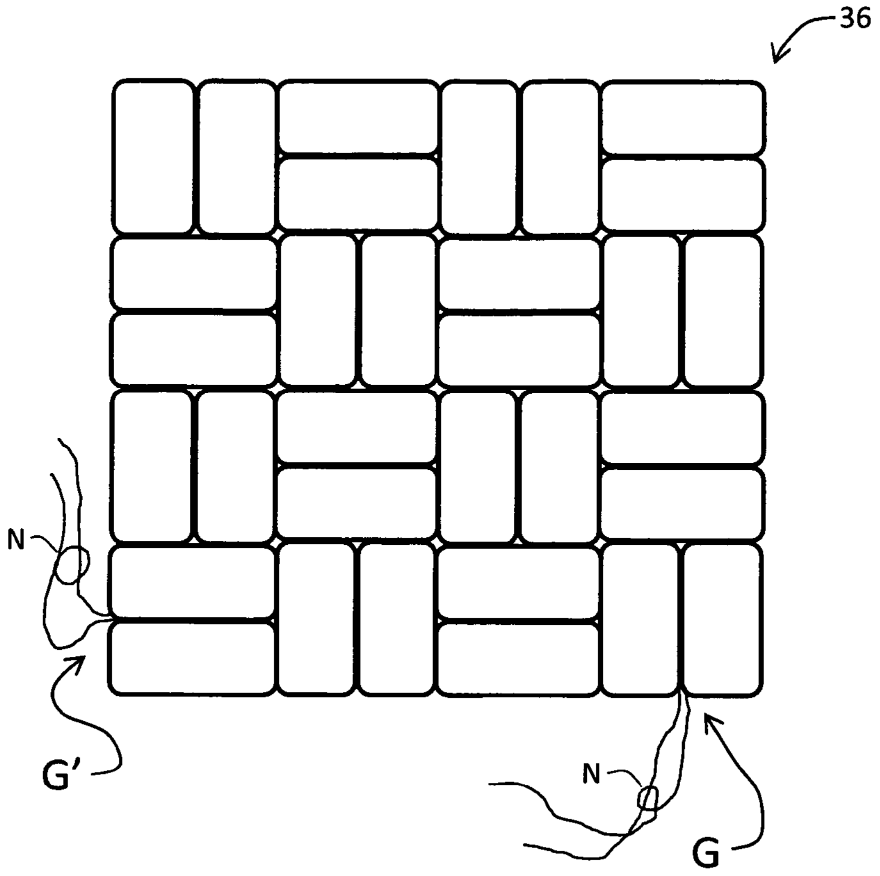
FIG. 22, as derived from FIGS. 19, 20 and 21, is a top plan view of a completed multiple cork arrangement with pulled length string attachments defining a cohesive parallel co-planar mat.

By tightening interengagement string strands 38A and 38B independently in this manner sequentially achieves the goal to pull the string strand slack from the center of all the respective interconnection string strands. The nature and logic of sequential pulling of the string strands as the corks are drawn together form a tightly abutting relationship of the construction will become self-evident and progressive to achieve the required result as seen in FIG. 22 of the drawings. The natural resiliency of the interengaged corks will help achieve a viable construction. The respective interconnecting string strands 38A and 38B, ends G and G' are knotted being pulled inwardly between the respective corks, hiding same to complete the construction.

It should be noted that the string tightening engagement points so designated A-G and A'-G' as hereinbefore described are illustrated as an example and any mid central string engagement point of inclusion can be used in the sequential systematic slackening reducing drawing the cork elements together process can be so achieved, also the created interengagement string strand slack should be pulled out at respective string end engagement points G and G'. Care should be exercised during the tightening sequence hereinbefore described that the respective string's free ends are not inwardly pulled back into their exit cork passageways which can be avoided by tying the string ends temporarily together. Alternately, or in addition thereto, interengagement string strands slack points at G and G' should or could be pulled simultaneously with all other attenuated tightening points.

After the above referred to initial tightening sequence has been achieved, a continuation of the tightening process is achieved by repeating the multiple pull points A through G, and A' through G', but by pulling both parts of the same string strand together first one interengagement string 38A and then 38B in this example and inducing additional compression of the corks from the outside perimeter during the tightening process.

Figure 23:
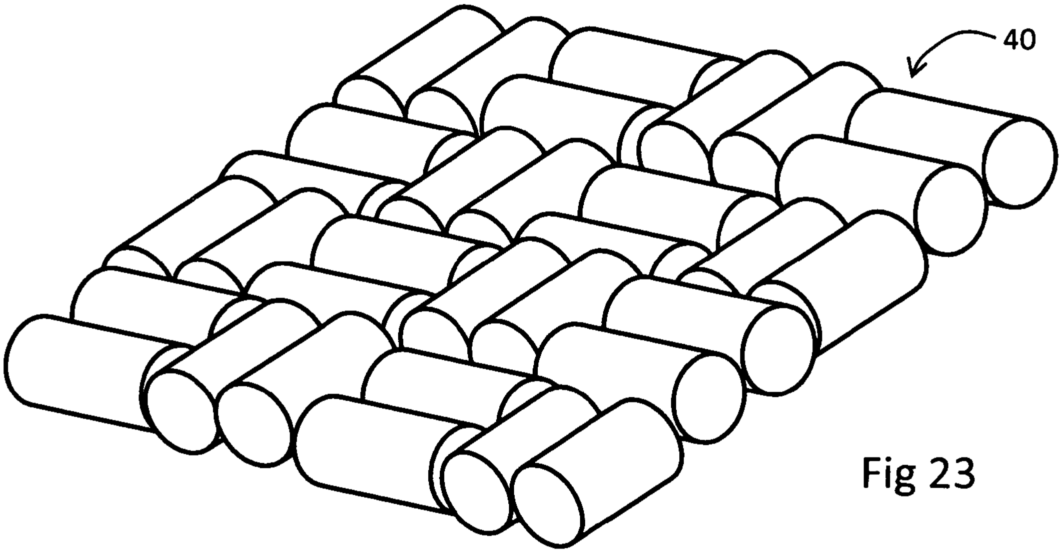
FIG. 23 is a perspective view of the completed cohesive co-planar mat construction set forth in FIG. 22.

As noted, a knot is applied to secure each interengagement string strand thus defining a finished construction at 40 as seen in FIG. 23 of the drawings so illustrated without string strands visible.

It will be apparent that based on the above referred to basic cork preparation, basic cork construction that by utilization of same construction steps a variety of different end form construction articles can be achieved including 3D and articulated constructions (not shown) well within the purvey of so defined invention and method steps. It will thus be seen that a new and multi-step method of interconnecting multiple cork elements to form a variety of useful integrated constructions has been illustrated and described and it will be apparent to those skilled in the art that various changes and modifications may be made thereto without departing from the spirit of the invention.

Therefore I claim:

1. A method of interconnecting multiple elements of yielding monolithic material into a dimensional construction comprises the steps of,

- a. forming tubular passageways through said elements defining multiple spaced interconnected openings therethrough,
- b. forming slits between and adjacent said tubular passageway openings inwardly from the exterior of said elements,
- c. passing a resilient yielding string strand through said tubular passageways of said multiple elements,
- d. drawing together multiple interconnected elements by foreshortening said string strands,
- e. embedding portions of said string strands within said slits in said elements between string strands directional changes and adjacent interconnected tubular passageways,
- f. securing multiple interconnected shaped elements together by retaining string strands to one another.

2. The method of interconnecting multiple elements set forth in claim 1 wherein said elements are uniformed shaped bottle corks.

3. The method of interconnecting multiple elements set forth in claim 1 wherein said tubular passageways through said elements extend longitudinally, transversely and angularly therein through respective end and side opposing surfaces of said elements.

4. The method of interconnecting multiple elements set forth in claim 1 wherein said drawing together of said uniform elements by foreshortening said string strands form interengaged consolidated constructions of co-planar uniform elements.

5. The method of interconnecting multiple elements set forth in claim 1 wherein said step of securing said multiple interconnected elements by retaining said string strands to one another, comprises tying said string strands together by retainment knots.

6. The method of interconnecting multiple elements set forth in claim 1 wherein passing said string strand through said passageway comprises, a repeatable multi-directional recurrent pattern between individual and aligned pairs of multiple shaped elements securing said multiple elements in inter-aligned adjacent groups.

7. The method of interconnecting multiple elements set forth in claim 1 wherein the step of drawing together multiple interconnected elements by foreshortening said string strands further comprises, pulling string strands sequentially from between said multiple elements centrally within so assembled construction.

8. A method of interconnecting multiple co-planar assembled bottle corks to form a variety of dimensional and articulated construction comprises, the steps of, a. forming tubular passageways through said corks defining multiple interconnecting openings therebetween, b. loosely passing at least one flexible string strand through said tubular passageways of said multiple corks, interconnecting all adjacent corks with a leading string end returning through said tubular passageways and a trailing string end extending from said passageway openings in said corks, c. embedding said string strand within slits in said corks between adjacent passageways, d. drawing together the multiple interconnected corks by pulling string strand portions between said adjacent corks, foreshortening said string strands, drawing said interconnected corks together, e. securing respective string strand ends to one another by retaining knots tied therein, f. positioning portions of said multiple unformed shaped co-planar assembled bottle cords construction in angular edge orientation to one another defining a hinge therebetween.

* * * * *